United States Patent [19]

Edelman

[11] Patent Number: 4,652,598
[45] Date of Patent: Mar. 24, 1987

[54] SILOXANE-CONTAINING POLYMERS

[75] Inventor: Robert Edelman, Staten Island, N.Y.

[73] Assignee: M&T Chemicals Inc., Woodbridge, N.J.

[21] Appl. No.: 795,695

[22] PCT Filed: Oct. 24, 1985

[86] PCT No.: PCT/US85/02061

§ 371 Date: Oct. 24, 1985

§ 102(e) Date: Oct. 24, 1985

[87] PCT Pub. No.: WO86/02593

PCT Pub. Date: May 9, 1986

Related U.S. Application Data

[63] Continuation-in-part of Ser. No. 664,129, Oct. 24, 1984, abandoned.

[51] Int. Cl.$^4$ ................................................. C08K 5/34
[52] U.S. Cl. ........................................ 524/99; 357/72; 524/104; 524/167; 524/173; 524/211; 524/233; 524/323; 528/26; 528/38; 556/419; 556/423

[58] Field of Search .................... 528/26, 38; 556/419, 556/423; 357/72; 524/99, 104, 167, 173, 211, 233, 323

[56] References Cited

U.S. PATENT DOCUMENTS

| | | | |
|---|---|---|---|
| 3,926,911 | 12/1975 | Greber et al. | 528/26 |
| 4,395,527 | 7/1983 | Berger | 528/26 |
| 4,520,075 | 5/1985 | Igarashi et al. | 528/26 |

Primary Examiner—Melvyn I. Marquis
Attorney, Agent, or Firm—S. H. Parker; J. Matalon; R. E. Bright

[57] ABSTRACT

Polyamic acids prepared from the condensation of dianhydrides (or trianhydrides) and diamines and preferably dissolved in a suitable solvent produce polyimide shaped articles (e.g. films) relatively free of voids, pinholes, cracks and bubbles when about 0.75 to about 5 mole percent of a polysiloxane is incorporated in the backbone of the polyamic acid.

14 Claims, No Drawings

SILOXANE-CONTAINING POLYMERS

REFERENCE TO RELATED APPLICATION

This application is a continuation-in-part of application Ser. No. 664,129, filed Oct. 24, 1984, now abandoned.

FIELD OF THE INVENTION

This invention relates to improved polyamic acids prepared by the reaction of dianhydrides (or trianhydrides) with diamines containing about 0.75 to about 5 mole percent of a polysiloxane incorporated in the backbone of the polyamic acid. Such polyamic acids, preferably dissolved in a suitable solvent, are readily converted into shaped polyimide articles which are relatively free of voids, pinholes, crack and bubbles. The polysiloxane incorporated in the backbone of the polyamic acid enables the water of imidization and any solvent present to be readily removed without producing significant imperfections in the shaped polyimide article prepared by imidization of the polyamic acid. The polysiloxane has a monomeric unit formula of

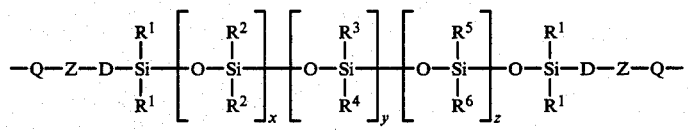

or of formula

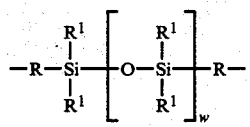

where the substituents are all as defined below.

DESCRIPTION OF THE PRIOR ART

U.S. Pat. No. 4,395,527 teaches that the properties of various polymers can be improved by the incorporation of a siloxane unit; the present invention relates to the discovery that low levels of siloxane incorporated into a polymer improve the drying of films or coatings without significantly affecting the other properties of the polymer.

BACKGROUND OF THE INVENTION

Polyamic acids, prepared by the reaction of dianhydrides (or trianhydrides) with diamines are typically prepared in high-boiling solvents such as diglyme or N-methylpyrrolidone. When used for coating purposes or for making film they are heated step-wise to 300° C. to remove water of imidization and solvent. Certain poly(half-amides) particularly those containing polar groups, are very difficult to free of solvent because of their high polarity. Further, after heating at temperatures as high as 300° C., films prepared from these systems tend to have significant numbers of bubbles or voids that are inimical to film quality.

It has been found unexpectedly, that when about 0.75 to about 5 mole percent of a polysiloxane are incorporated in polyamic acid backbone, the polyimide film formed can be more easily freed of solvent and water of imidization than a control film containing no polysiloxane.

DESCRIPTION OF THE INVENTION

It has been found that the drying properties of polyamic acids can be improved by the presence of about 0.75 to about 5 mole percent of a polysiloxane having a monomeric unit formula of

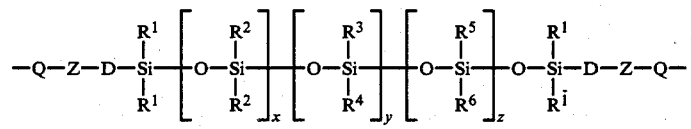

or of formula

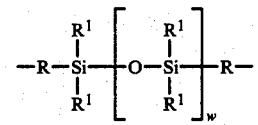

where
Q is a substituted or unsubstituted aromatic group;
Z is —O—, —S—,

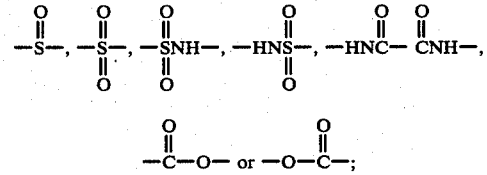

R and D is each unsubstituted or substituted hydrocarbylene;
$R^1$, $R^2$, $R^3$, $R^4$, $R^5$ and $R^6$ each independently unsubstituted or substituted hydrocarbyl;
x, y and z each independently has a value from 0 to 100, and w has a value from 1 to 100.
and that polyimides or poly(amide-imides) prepared from such polyamic acids are suited for a variety of high-performance applications.

The monomeric unit of formula

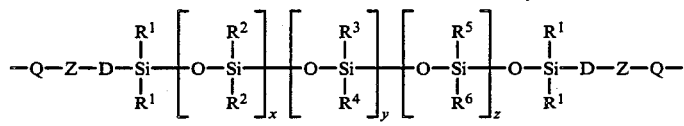

or of formula

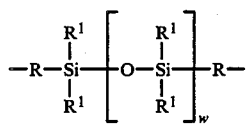

is derived from a bis(functional)polysiloxane of formula

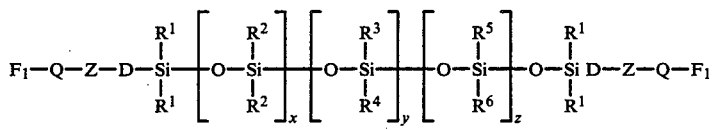

or of formula

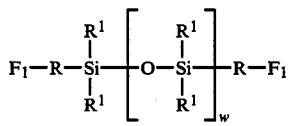

where $F_1$ is a primary amino group (i.e. —$NH_2$) or a dicarboxylic acid anhydride group (i.e.

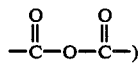

and Q, Z, R, D, $R^1$, $R^2$, $R^3$, $R^4$, $R^5$, $R^6$, x, y, z and w are as described above.

$F_1$ can be directly bonded to Q or bonded via an intermediate alkyl or alkoxy group of from 1 to 8 carbon atoms, an aryl group, or via an intermediate Q—Z— group.

Q is an aromatic nucleus and can be carbocyclic or heterocyclic; it can contain one or more rings and can be unsubstituted or substituted by one or more groups that do not interfere with the use to which the unit will be put. Thus, Q can be carbocyclic aromatic of 6 to 18 ring carbon atoms such as phenylene, naphthylene, anthracenylene and phenanthrylene. Q can be unsubstituted or substituted by from 1 to 4 of: alkyl or 1 to 12 carbon atoms, alkenyl of 2 to 12 carbon atoms, alkynyl of 2 to 12 carbon atoms, cycloalkyl of 4 to 8 carbon atoms, alkoxy of 1 to 12 carbon atoms, alkylthio of 1 to 12 carbon atoms, phenyl, alkylphenylene having 1 to 12 carbon atoms in the alkyl group, phenoxy, phenylthio, alkylcarbonyloxy of 2 to 12 carbon atoms, phenylalkylene of 1 to 12 carbon atoms in the alkylene group, alkylcarbonyl of 2 to 12 carbon atoms, alkoxycarbonyl of 2 to 12 carbon atoms, bromo, chloro, fluoro, iodo, nitro, cyano, cyanothio, carboxy, carbonyl, hydroxy, mercapto, formyl, thioformyl and mercaptocarbonyl.

Q can also be substituted or unsubstituted heterocyclic aromatic of 5 to 18 ring atoms, where the hetero atoms are selected from N, O and S, such as pyridinyl, pyridazinyl, pyrimidinyl, pyrazinyl, furanyl, thiofuranyl, pyrrolinyl, indenyl, benzofuranyl, benzothiofuranyl, indolinyl, quinolinyl and isoquinolinyl; substituents on the heterocyclic aromatic nucleus are selected from the same group as the carbocyclic aromatic nuclei.

Q can also be an aliphatic group; these tend to result in lower thermal resistance and are thus useful where thermal properties are not essential.

R and D is each substituted or unsubstituted hydrocarbylene of 1 or 3 to 18 carbon atoms such as branched or linear alkylene of up to 12 carbon atoms or said alkylene interrupted in the chain by phenylene, or arylene.

$R^1$, $R^2$, $R^3$, $R^4$, $R^5$ and $R^6$ each independently is unsubstituted or substituted hydrocarbyl such as alkyl of 1 to 12 carbon atoms, alkenyl of 2 to 12 carbon atoms, alkynyl of 2 to 12 carbon atoms, cycloalkyl of 4 to 8 carbon atoms, phenyl, alkylphenylene where the alkyl group contains 1 to 12 carbon atoms, phenylalkylene where the alkylene group contains 1 to 12 carbon atoms, alkenylphenylene with 2 to 12 carbon atoms in the alkenyl group. When substituted, these hydrocarbyl groups can be substituted by Br, Cl, I, F, —NC, —$NO_2$, —OCN, alkoxy of 1 to 8 carbon atoms, —S—($C_1$-$C_8$)alkyl,

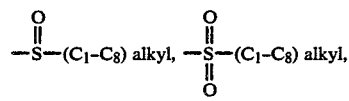

—S—S—($C_1$-$C_8$)alkyl, —COOH, —COSH, —CSOH—, —$CONH_2$, —CN, —CHO, —CHS, —OH, —SH, —NCO, and —$NR_7R_8$ where $R_7$ and $R_8$ independently are hydrogen or lower alkyl, x, y and z each independently has a value from 0 to 100.

In one embodiment the bis(functional)polysiloxane has the formula

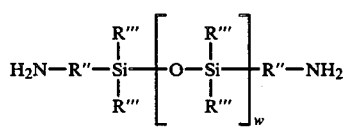

wherein R" is alkylene or arylene and each R''' is independently $C_1$-$C_4$ alkyl or phenyl. Typical compounds falling within the indicated definition include

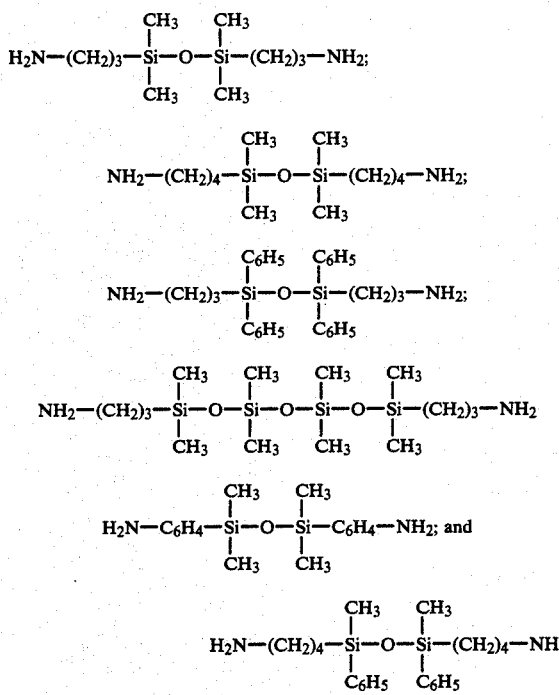

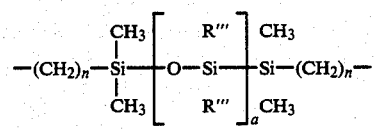

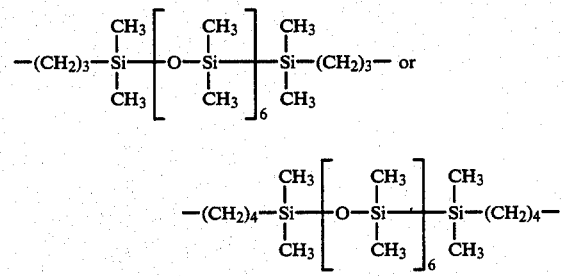

Preferably the polysiloxane will have a monomeric unit formula of $$-(CH_2)_n-\underset{\underset{CH_3}{|}}{\overset{\overset{CH_3}{|}}{Si}}-\left[O-\underset{\underset{R'''}{|}}{\overset{\overset{R'''}{|}}{Si}}\right]_a-\underset{\underset{CH_3}{|}}{\overset{\overset{CH_3}{|}}{Si}}-(CH_2)_n-$$

wherein n is an integer of 1 to 6, a has a value of 1 to 30 and each R''' is independently $C_1$-$C_4$ alkyl or phenyl.

Especially preferred are the polysiloxanes having the monomeric unit formula of $$-(CH_2)_3-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_6-\underset{\underset{CH_3}{|}}{\overset{\overset{CH_3}{|}}{Si}}-(CH_2)_3- \text{ or}$$

$$-(CH_2)_4-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_6-\underset{\underset{CH_3}{|}}{\overset{\overset{CH_3}{|}}{Si}}-(CH_2)_4-.$$

In another embodiment, x, y and z are all zero, Q is monocarbocyclic aromatic and the polysiloxane unit has the formula

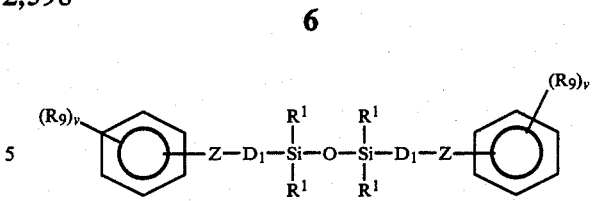

where
v is 0 to 4;
$R_9$ is lower alkyl, lower alkenyl, lower alkynyl, cycloalkyl or 4 to 8 carbon atoms, lower alkoxy, lower alkylthio, phenyl, loweralkylphenylene, phenylloweralkylene, loweralkenylphenylene, phenoxy, phenylthio, loweralkylcarbonyl, loweralkylcarbonyloxy, loweralkoxycarbonyl. bromo, chloro, fluoro, iodo, nitro, cyano, cyanthio, carboxyl, carbonyl, hydroxyl, mercapto, and mercaptocarbonyl;
Z is —O—, —S—,

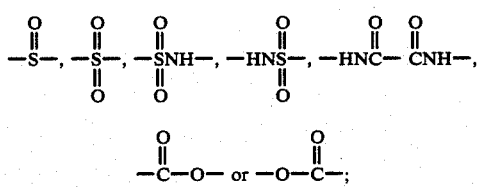

$D_1$ is methylene or alkylene of 3 to 8 carbon atoms;
$R^1$ is lower alkyl, lower alkenyl, lower alkynyl, phenyl, loweralkylphenylene, phenylloweralkylene, or lower alkenylphenylene.

In this embodiment the units of particular interest are those units where
v is 0 or 1;
$D_1$ is methylene or alkylene of 3 to 8 carbon atoms, and notably those where
v is 0 or 1
$D_1$ is methylene or alkylene of 3 to 8 carbon atoms and
$R_1$ is lower alkyl.

In a particularly preferred configuration of this embodiment,
v is 0, z is —O—,
D is methylene, propylene or butylene, and
$R^1$ is alkyl of 1 to 3 carbon atoms.

In a specific embodiment, polymers contain the unit of formula:

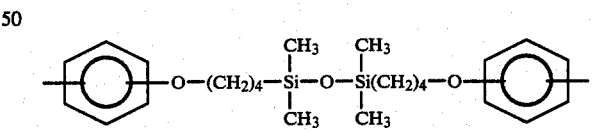

In another embodiment, the unit has the formula:

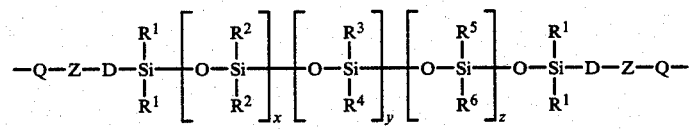

where
Q, Z and D are as previously defined and
x has a value from 0 to 100
y has a value from 0 to 20 z has a value from 0 to 20;

$R^1$ is unsubstituted hydrocarbyl of 1 to 18 carbon atoms;

$R^2$ is alkyl of 1 to 12 carbon atoms;

$R^3$ is phenyl or alkylphenylene of 7 to 18 carbon atoms or alkyl of 1 to 12 carbon atoms;

$R^4$ is alkyl of 1 to 12 carbon atoms, phenyl alkylphenylene of 7 to 18 carbon atoms or alkenyl of 2 to 12 carbon atoms;

$R^5$ is alkenyl of 2 to 12 carbon atoms or substituted alkyl of 1 to 12 carbon atoms;

$R^6$ is alkyl of 1 to 12 carbon atoms, phenyl, alkylphenylene of 7 to 18 carbon atoms, alkenyl of 2 to 12 carbon atoms or substituted alkyl of 1 to 12 carbon atoms.

In the narrower embodiments, Q is mono-carbocyclic aromatic and the polysiloxane unit has the formula In a still narrower embodiment, v is 0 or 1

Z is —O— or —S—

$D_1$ is methylene, propylene or butylene;

$R_1$ is alkyl of 1 to 3 carbon atoms;

$R_2$ is alkyl of 1 to 3 carbon atoms;

$R^3$ is alkyl of 1 to 3 carbon atoms or phenyl;

$R^4$ is alkyl of 1 to 3 carbon atoms, alkenyl or 2 or 4 carbon atoms or said alkyl substituted by amino, cyano, hydroxyl or —CONH$_2$;

$R^5$ is alkenyl of 2 to 4 carbon atoms or alkyl of 1 to 3 carbon atoms substituted by amino, cyano, hydroxyl or —CONH$_2$;

$R^6$ is alkyl of 1 to 3 carbon atoms, alkenyl of 2 to 4 carbon atoms or alkyl of 1 to 3 carbon atoms substituted by amino, cyano, hydroxyl or —CONH$_2$; and x, y and z are as previously defined.

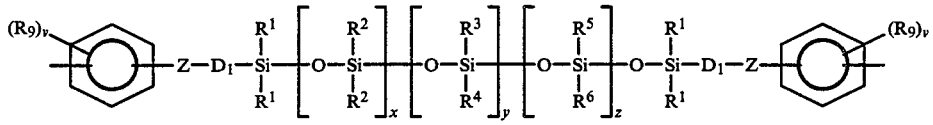

where
v is 0 to 4
$R_9$ is as previously defined
Z is —O—, —S—,

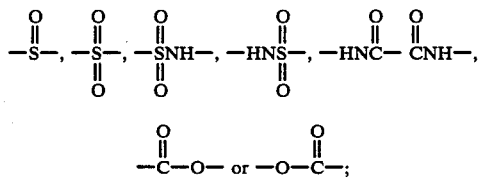

$D_1$ is methylene or alkylene of 3 to 8 carbon atoms;

$R^1$ is lower alkyl, lower alkenyl, lower alkynyl, phenyl, lower alkylphenylene, phenyl lower alkylene or lower alkenyl phenylene;

$R^2$ is alkyl of 1 to 12 carbon atoms;

$R^3$ is phenyl, alkyl phenylene of 7 to 18 carbon atoms or alkyl of 1 to 12 carbon atoms;

$R^4$ is alkyl of 1 to 12 carbon atoms, phenyl, alkylphenylene of 7 to 18 carbon atoms, alkenyl of 2 to 12 carbon atoms or substituted alkyl of 1 to 12 carbon atoms, where the substituents are as previously indicated;

$R^5$ and $R^6$ are as previously defined;

x has a value from 0 to 100 y has a value from 0 to 20, and z has a value from 0 to 20.

$D_1$ is methylene or alkylene of 3 to 8 carbon atoms;

$R^1$ is lower alkyl;

$R^2$ is lower alkyl;

$R^3$ is lower alkyl or phenyl;

$R^4$ is lower alkyl, phenyl, lower alkenyl or substituted lower alkyl.

$R^5$ is lower alkenyl or substituted lower alkyl.

$R^6$ is lower alkyl, lower alkenyl or substituted lower alkyl, the substituents on $R_4$, $R_5$ and $R_6$ lower alkyls being independently selected from halogen, amino, cyano, —CONH$_2$, hydroxyl, and mercapto;

x has a value from 0 to 100 y has a value from 0 to 20 and z has a value from 0 to 20.

In another embodiment, v is 0,

Z is —O—, $D_1$ is methylene or butylene, $R^1$ is methyl, $R^2$ is methyl, $R^3$ is methyl or phenyl, $R^4$ is methyl, vinyl or phenyl, $R^5$ is vinyl or methyl, ethyl or propyl optionally substituted by amino, cyano, hydroxyl or —CONH$_2$;

$R^6$ is vinyl or methyl, ethyl or propyl optionally substituted by amino, cyano, hydroxyl or —CONH$_2$.

A particularly useful bis(functional)polysiloxane is one having the formula

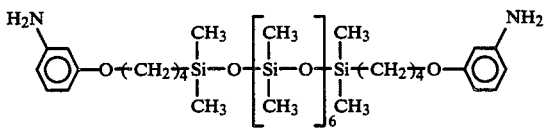

The preparation of the bis(functional)polysiloxanes useful for the present invention is well knon in the prior art. For example, see U.S. Pat. No. 4,395,527 which is incorporated by reference. British Pat. No. 1,062,418 also describes useful methods of preparing linear polysiloxanes which are of use in this invention.

The term "polyamic acids" as used herein is intended to embrace the reaction product resulting from the reaction in the presence of a polysiloxane as described above, of a diamine of the type described below with a dianhydride or with a trianhydride of the type described below. The polyamic acid prepared from the diamine will, when cyclized, result in a polyimide whereas that prepared from the trianhydride results in a poly(amide-imide). The polyamic acid preparation requires that amounts of the total diamine and the total anhydride content be equimolar. Since the polysiloxane employed in the preparation of the polyamic acid will contain diamine and/or anhydride groups, adjustment must be made in the amount of diamine or anhydride employed as starting monomers depending on the diamine or anhydride content of the polysiloxane. As previously mentioned, the polysiloxane is employed in an amount of about 0.75 to about 5 mole percent (based on the total moles of all monomers), preferably 15 to 25 mole percent. Thus in a typical case, 2 mole percent of a diaminopolysiloxane would be employed together with 48 mole percent of a diamine and 50 mole percent of a dianhydride to prepare a useful polyamic acid.

The polyamic acids may be prepared in a dry, "powder" form but are usually prepared as solutions containing about 5 to about 50 wt. % solids, preferably 20–40 wt. % solids. The solvent typically employed for such solutions is one or more aliphatic, acyclic or cyclic ethers such as tetrahydrofuran, m-dioxane, p-dioxane, monoglyme, diglyme, triglyme, tetraglyme and mixtures thereof.

After the polyamic acid has been prepared, it is readily converted into the corresponding polyimide or poly(amide-imide) by heating at temperatures in the range of 100° to 300° C. for 10 minutes to 1 hour or more. During the heating, the polyamic acid is cyclized and the water of imidization (and any solvent present) is driven off, thereby resulting in the polyimide or poly(amide-imide) shaped article. The term "shaped article" is intended to cover film composites, fibers, wire coatings, adhesives and the like.

As mentioned previously, incorporation of the polysiloxane into the polyamic acid backbone (by reacting the diamine and dianhydride in the presence of the polysiloxane) allows for ready removal of water of imidization and any solvent at lower temperatures and permits the production of polyimide or poly(amide-imide) shaped articles which are relatively free of voids, pinholes, cracks and bubbles, provided up to about 5 mole percent of the polysiloxane is present in the polyamic acid backbone. Furthermore, it has been surprisingly found that the shaped polyimide or poly(amide-imide) article is relatively resistant to attack by methylene chloride. One of the drawbacks to prior art polyimides containing high levels of polysiloxanes is the vulnerability to attack by methylene chloride (which is widely used as a paint solvent, paint stripper, degreaser, etc.) It has also been found that when the level of polysiloxane is maintained at a maximum of about 5 mole percent, the physical properties, e.g. Tg, modulus, solvent resistance are only moderately reduced but are still at an acceptable level, while processabilty has been dramatically improved. Use of polysiloxanes in amounts above about 5 wt. % provides no further improvement in processabilty, but results in significant deterioration of desirable physical properties.

Polyimides are prepared by reacting a dianhydride with a diamine:

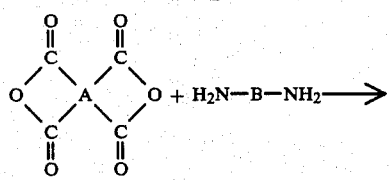

-continued

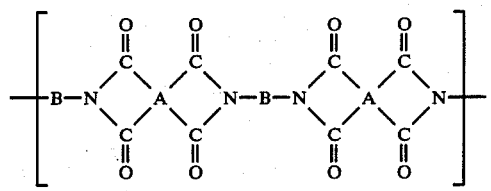

Many of these polyimides, while useful as protective coatings for semiconductors and other electronic devices, suffer from the defect that they are insoluble in virtually all of the common organic solvents. The polyamic acid, however, is soluble and so it has been the practice to form it:

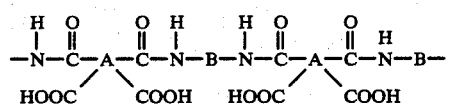

and to provide the polyamic acid, in suitable solvents such as dimethyl sulfoxide or N-methyl pyrrolidone, to the ultimate user. This solution is applied to the substrate and the coated substrate is thereafter heated to evaporate the solvent and to convert the polyamic acid to the corresponding polyimide:

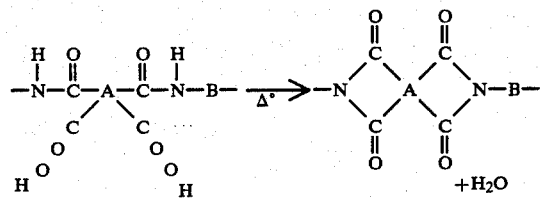

This procedure requires that the substrate be exposed to temperature on the order of 150° to 300° C. to convert the half-amide to the imide. Certain polyamic acids, particularly those containing polar groups are very difficult to free of solvent and water; thus even after heating at temperatures as high as 300° C., films prepared from poly(half-amides) have significant numbers of bubbles or voids that are detrimental to film quality.

The polyimides are employed as wire coatings and as coatings for filaments of metal, glass and ceramic. In another embodiment, the polyimides are used as adhesives. In still another embodiment, the polyimides are used as primers or adhesion promoters between a substrate, such as glass, metal and ceramic, and a matrix such as epoxy, polyester, phenolic and rubber.

The reaction between the diamine and dianhydride proceeds stepwise, with the formation of the polyamic acid being the first step and cyclization to the polyimide being the second step. As indicated, the polyamic acid is more soluble than the polyimide and for certain coatings applications, where the polyimide has been formulated to be highly resistant to solvents or even thermoset, it is necessary to apply the polyamic acid, evaporate the solvent and thereafter cure in situ.

The siloxane-containing polyimides of this invention include the reaction product of an aromatic or aliphatic tetracarboxylic acid dianhydride with an amino polysiloxane of formula

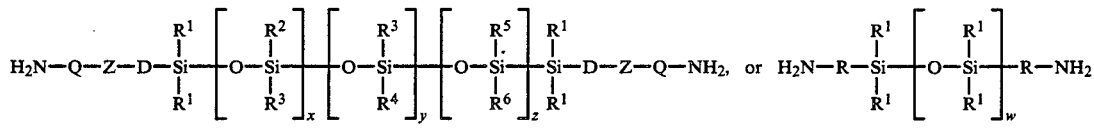

where the various elements are all as previously defined to provide a polyimide containing the unit

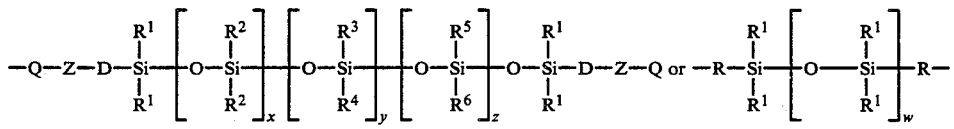

As indicated, Q can be carbocyclic aromatic, such as phenylene, naphthylene, anthracenylene and phenanthrylene, that is optionally substituted. The substituents on Q can be any that do not interfere with the ability to react to form an imide. Thus, Q can be substituted by from 1 to 4 substituents, as previously defined.

As indicated, polyimides are prepared by the reaction of a dianhydride with a diamine. The dianhydride can be represented by the formula

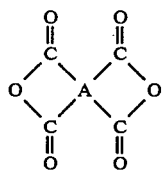

where A is the tetravalent residue of a tetracarboxylic acid anhydride. Thus, the polyimide will contain small amounts of units of formula

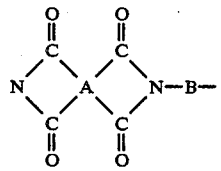

where —B— is the unit

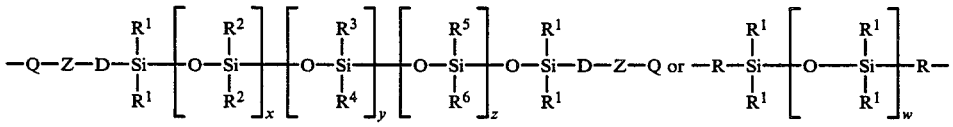

in the dianhydride of general formula

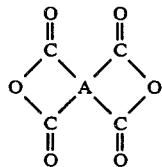

A is a tetravalent radical selected from substituted and unsubstituted aliphatic, cycloaliphatic, heterocyclic, aromatic groups and combinations thereof. Thus, A can be a tetravalent benzene or naphthalene nucleus or a tetravalent group of formula

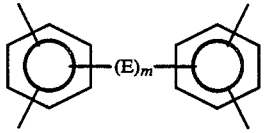

where m is 0 or 1 and E is —O—, —S—,

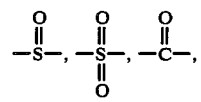

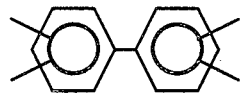

or —$C_yH_{2y}$— where y is an integer from 1 to 8.

In this embodiment, A is illustrated by:

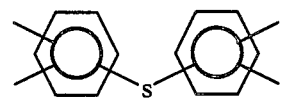

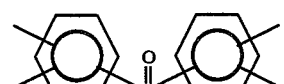

-continued

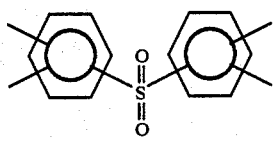

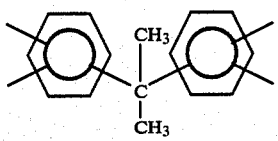

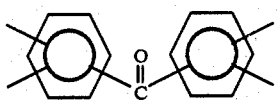

and specific anhydrides include pyromellitic dianhydride,
3,3',4,4'-benzophenone tetracarboxylic dianhydride
2,2',3,3',-benzophenone tetracarboxylic dianhydride.
3,3',4,4', -diphenyl tetracarboxylic dianhydride,
2,2',3,3'-diphenyl tetracarboxylic dianhydride,
2,2-bis-(3,4-dicarboxyphenyl)propane dianhydride,
2,2-bis-(2,3-dicarboxyphenyl)propane dianhydride
Bis-(3,4-dicarboxyphenyl)ether dianhydride,
Bis-(3,4-dicarboxyphenyl)sulfone dianhydride
Bis-(3,4-dicarboxyphenyl)sulfide dianhydride
1,1-bis-(2,3-dicarboxyphenyl)ethane dianhydride,
1,1-bis-(3,4-dicarboxyphenyl)ethane dianhydride,
Bis-(2,3-dicarboxyphenyl)methane dianhydride
Bis-(3,4-dicarboxyphenyl)methane dianhydride,
2,3,6,7-naphthalene tetracarboxylic dianhydride,
1,2,4,5-naphthalene tetracarboxylic dianhydride,
1,2,5,6-naphthalene tetracarboxylic dianhydride,
Benzene-1,2,3,4-tetracarboxylic dianhydride
Perylene-3,4,9,10-tetracarboxylic dianhydride
Pyrazine-2,3,5,6-tetracarboxylic dianhydride
Thiophene-2,3,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
1,2,3,4-butane tetracarboxylic dianhydride
3,4,3',4'-benzophenone tetracarboxylic dianhydride
azobenzene tetracarboxylic dianhydride
2,3,4,5-tetrahydrofuran dianhydride
p-phenylenebis(trimellitate)anhydride
1,2-ethylenebis(trimellitate)anhydride
2,2-propanebis(p-phenylene trimellitate)anydride
4,4'-{p-phenylenebis(phenylimino)carbonyl diphthalic}anhydride
4,4'-diphenylmethanebis(trimellitamide)anhydride and mixtures thereof.

Because of relative availability, some of the preferred species of aromatic dianhydrides are:
pyromellitic dianhydride
benzophenone tetracarboxylic acid dianhydride
diphenyl tetracarboxylic acid dianhydride bis(3,4-dicarboxyphenyl)sulfone dianhydride
2,2-bis(3,4-dicarboxyphenyl)propane dianhydride The anhydride can also be aliphatic in nature, such as cyclopentane tetracarboxylic acid dianhydride, cyclohexane tetracarboxylic acid dianhydride and butane tetracarboxylic acid dianhydride.

The anhydride component can be used alone or in combination with one or more other anhydrides.

As described, the polyimides are formed from the reaction of a dianhydride and a diamine. The diamine can comprise one or more organic diamines. The organic diamine can have the general formula $H_2N-Y-NH_2$ where Y is a divalent residue. Y can be aliphatic, including alkylene of 1 to 20 carbon atoms or cycloalkylene of 4 to 8 carbon atoms. In the preferred embodiment, to provide superior properties, Y is the residue of an aromatic diamine. Thus, Y can be phenylene, diphenylene, naphthylene or a group of formula

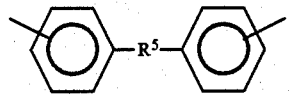

where $R^5$ is branched or linear alkylene of 1 to 20 carbon atoms, —S—,

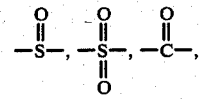

or —O—. The aryl nuclei can be substituted by lower alkyl, lower alkoxy or other noninterfering groups.

Among the organic diamines that are useful are:
m-phenylenediamine;
p-phenylenediamine;
4,4'-diaminodiphenylpropane;
4,4'-diaminodiphenylmethane (hereinafter referred to as "methylenedianiline");
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butyl)phenyl ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4'-dimethylheptamethylenediamine;
2,11-dodecanediamine;
2,2-dimethylpropylenediamine;
octamethylenediamine;
3-methoxyhexamethylenediamine;

2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis-(3-aminopropyl)amine;
hexamethylenediamine;
heptamethylenediamine;
nonamethylenediamine;
and mixtures thereof.

$R_5$ can also be the group of formula —O—G'—O— where G' is phenylene or a group of formula

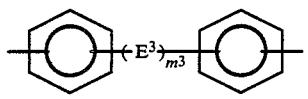

where $m^3$ is 0 or 1 and $E^3$ is —O—, —S—,

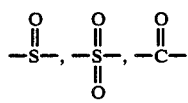

or linear or branched alkylene of 1 to 8 carbon atoms.

This embodiment is illustrated by the following diamines:

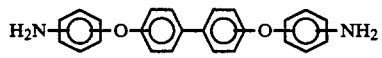

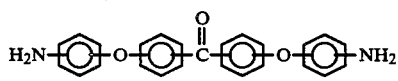

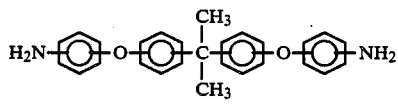

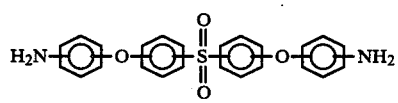

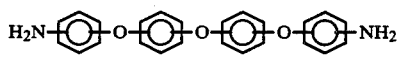

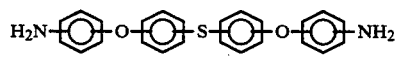

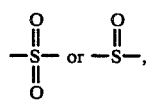

Similarly, and by analogy, the ether linkage can be replaced by —S—,

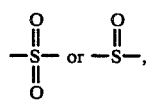

to provide amines.

The ether-containing diamines impart solubility to polyimides fabricated with them. They can be used as the sole amine component of a polyimide, they can be used in conjunction with other diamines and can be used in conjunction with the bis(amino)polysiloxane, with or without other diamines, to provide polyimides whose properties such as Tg and solubility can be tailored for specific applications.

Y can also be the residue of a diamine macrocyclic crown ether.

Additionally, one can use a functionally substituted diamine as part of the diamine component to provide functional sites for grafting and cross-linking, for modifying the polyimide to become photosensitive, hydrophilic, antiseptic, fungicidal and the like.

The functionally substituted amine will have the general formula

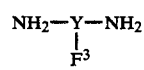

or

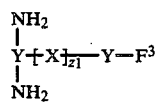

or

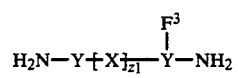

or

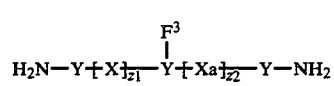

where Y is an aromatic nucleus, X and $X_a$, independently, are —O—, —S—, $$-\overset{O}{\underset{O}{\overset{\|}{S}}}-,$$

linear or branched alkylene of 1 to 20 carbon atom, and $z_1$ and $z_2$ each independently is 0 or 1.

The polyimides will contain the group of formula:

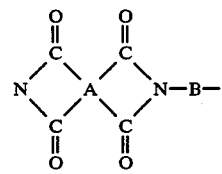

where A and B are one or more of the materials previously described. The imide is formed from the corresponding polyamic acid:

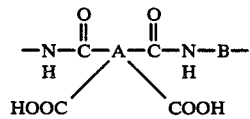

It is apparent that there are a number of variables available to the chemist in formulating useful polyimides. The variables include the anhydride and the amine.

As indicated, the dianhydride will have the formula:

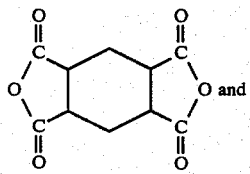

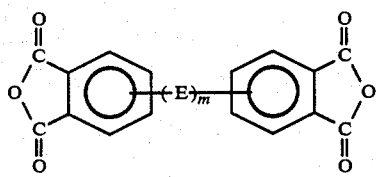

where E and m have been defined.

The polyimide can be applied over electrically insulating layers of silicon oxide, silicon nitride, aluminum nitride and the like; it can also be applied as an insulating layer in place of those materials.

Another semiconductor application involves the use of a siloxane-containing polyimide as a passivation coating on a semiconductor device. That is the final outer coating on a device which, at present, is frequently glass.

In an alternative mode of providing a polyimide passivation coating on a semiconductor device, one can apply by spin coating, a layer of polyamic acid to a device and thereafter heat the coated device to evaporate the solvent cure to provide a water impermeable, scratch-resistant, continuous passivation coating for the semiconductor device.

Because of their adhesive and dielectric properties, the polyimide containing the siloxane unit can be used to combine two or more layers of chips to provide multilayer semiconductor devices. They are particularly useful in thin-film products—films, enamels, adhesives, coatings and fibers.

There should also be mentioned the polyesterimides, containing both imide and ester linkages. In one illustration, trimellitic anhydride is reacted with hydroquinone diacetate to yield a dianhydride of formula

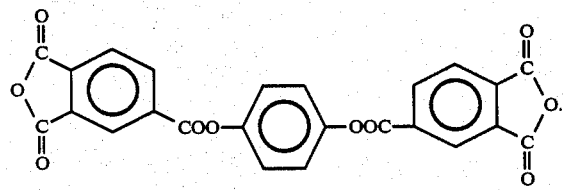

This dianhydride is reacted with a diamine to provide a polyesterimide. Alternatively, one can react a diamine, such as m-phenylene diamine with trimellitic anhydride to an imide of formula:

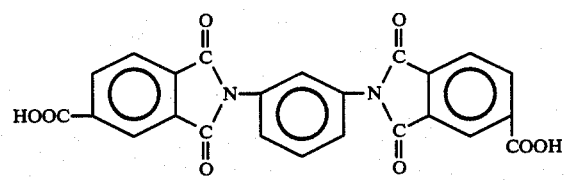

This imide can be further reacted with hydroxyl-functional materials, such as hydroxyl-terminated polyesters having a branched structure to allow crosslinking.

Small amounts of the siloxane unit can readily be incorporated into these polyesterimides by appropriate selection of functional group F.

Poly(amide-imide) is the reaction product of an organic diamine with a tricarboxylic acid anhydride:

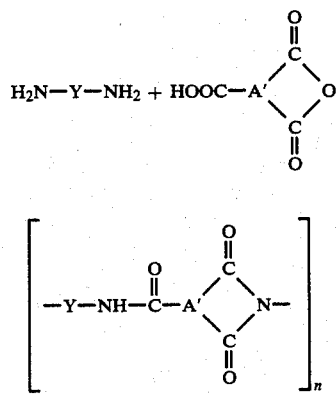

The diamine component can be selected from the same groups as previously described in connection with the polyimides.

In the tricarboxylic acid anhydride, A' is a trivalent organic radical, obtained from such compounds as: trimellitic anhydride; 2,6,7-naphthalene tricarboxylic anhydride, 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene 3,3'4-tricarboxylic anhydride; 3,4,10-propylene tricarboxylic anhydride; 3,4-dicarboxyphenyl-3-carboxyphenyl ether anhydride; ethylene tricarboxylic anhydride; 1,2,5-naphthalene tricarboxylic anhydride, etc. Also useful are the corresponding acids of such anhydrides.

There can also be used the triacid anhydride analogues of the diether-containing anhydrides described above in connection with the polyimides.

Part of the amine component can be replaced by a bis(amino-siloxane); part of the anhydride component can be replaced by a siloxane-containing triacid anhydride. Thus, there is provided a poly(amide-imide) containing small amounts of a siloxane unit of formula

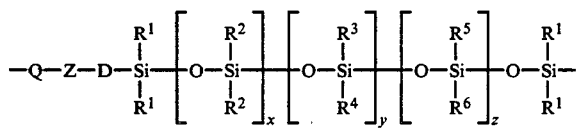

where the various elements have previously been described.

As in the case with the polyimides, the reaction proceeds stepwise, with the formation of the amide taking place by simply combining and mixing the amine component with the triacid anhydride component. The imide is formed by heating at temperatures on the order of 180° C. to 200° C. to effect cyclization.

Poly(amide-imides) containing small amounts of the siloxane unit display excellent high temperature performance, being serviceable at temperatures from cryogenic to 500° F. and capable of withstanding cycling; they have high tensile, flexural, impact and compressive strengths, superior elongation and good resistance to creep. Further, they display low coefficient of thermal expansion, flame retardance, resistance to nuclear and UV radiation and good electrical characteristics.

Poly(amide-imides) containing small amounts of the siloxane unit have a variety of uses. Because of their high temperature resistance and corona resistance, they are suitable as insulation for electrical conductors. Solutions of the polyamide or the poly(amide-imide) can be applied to electrical conductors such as copper wire, aluminum, etc., and thereafter heated to evaporate the solvent and/or to complete the imidization. Thus, motor and generator wire coatings can be formed having good electrical properties, heat resistance and flexibility. Films and fibers can be extruded or can be cast from solutions of either the poly(amide-imide) or the poly(amide). Solvents which can be employed are, the example, N,N-dimethylformamide, N,N-dimethylacetamide, N,N-diethylformamide, N,N-diethylsulfoxide, N-methyl2-pyrrolidone, pyridine, dimethylsulfone, hexamethylphosphoramide, tetramethylenesulfone, phenol, phenol-water mixtures, and dimethyltetramethylenesulfone. Mixtures of these solvents with other inert organic solvents such as benzene, benzonitrile, dioxane, betaethoxyethylacetate, butyrolactone, xylene, toluene and cyclohexane, can also be employed.

Since part of the amine component employed to fabricate a poly(amide-imide) can be the amine substituted siloxane unit described, the poly(amide-imide) will contain a low level of siloxane.

EXAMPLE 1

This example illustrates the effect of a small amount of siloxane on a polyimide film and compares the effect of several siloxanes.

A polyamic acid solution, 30% solids in diglyme, was prepared as follows; each solution contained 2.5 mole percent of the indicated siloxane:

In a 2-liter 3-neck flask fitted with high torque stirrer, ice-water cooling bath, thermometer and nitrogen blanket, 141.79 g (0.57 mole) of 3,3'-diaminodiphenylsulfone, 99.7% pure (mol wt. 248), was charged along with 330.84 g of filtered diglyme under a nitrogen atmosphere. Agitation was applied to get a clear solution followed by cooling. The temperature of the entire synthesis was maintained at 15° C. to 20° C. throughout. To the cooled solution was added 195.15 g (0.6 mole) of 3,3'4.4'-benzophenone tetracarboxylic dianhydride, 99% pure, (mol wt 322) along with 455.35 g of diglyme in portions so as to maintain 30% solids concentration at any given time. This was done under a nitrogen atmosphere, while continuing agitation. This addition of BTDA and diglyme was completed in about one hour. Then 0.03 mole of the aminopolysiloxane was charged along with 63.98 g diglyme in about 20 minutes under a nitrogen atmosphere. The reaction mass was allowed to agitate at 20° C. for 16 hours. The agitation was turned off and the high viscosity pressure filtered under a nitrogen atmosphere into a polypropylene bottle and then stored in a refrigerator at 0° C. to 5° C.

The procedure was repeated using 2.5 mole % of each of the following diamino siloxanes:

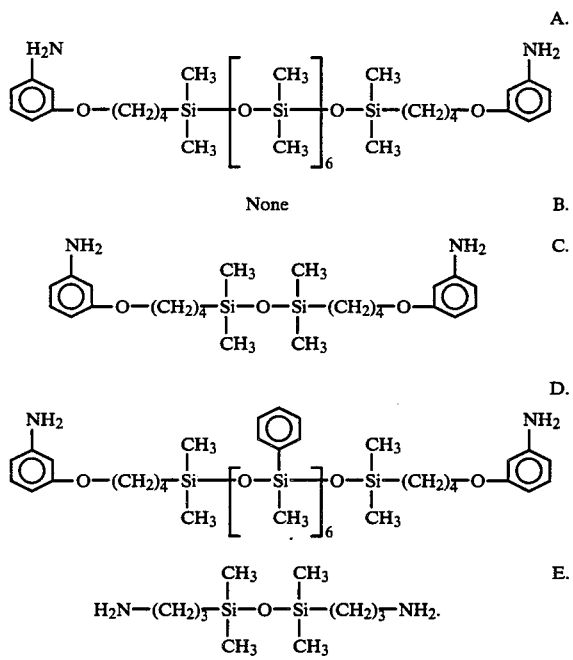

Each composition, being 30% solids in diglyme was spread on a glass plate treated with a fluorocarbon release agent. A doctor blade was used to obtain a uniform 12 mil wet film. The film was baked in a series of discrete steps at the following temperatures and times:

75° C./1 hour
100° C./1 hour
150° C./1 hour
200° C./30 min.
250° C./30 min.

at the end of the last step the coatings were heated to 300° C., held at this temperature for 15 minutes and then cooled slowly.

Examination of the coatings prepared in this manner showed significant differences which are outlined below:

A: A uniform yellow coating with film-like integrity was prepared with a very low level of pinholes, cracks and bubbles.

B: (control) The coating had a pronounced spongy foam-like appearance with huge numbers of small bubbles. It did not have the film-like integrity.

C: The coating had a light yellow color with film-like integrity. It had a significant number of streaks composed of large numbers of very small bubbles.

D: A light yellow coating with good film-like integrity was formed. Only a low level of cracks and pinholes were observed.

E: A pale yellow coating was observed which showed intensive cracking and very heavy concentrations of bubbles.

The precise mechanism whereby the inclusion of a small amount of polysiloxane has such a dramatic effect on the film properties of a resin are not fully understood. One explanation is that the small amounts of siloxane open channels or create interstitial pores whereby solvents and/or water vapor can readily exit the film. Another explanation is that the polysiloxane somehow has a wicking effect, carrying liquids to the surface. This latter effect was empirically manifested when a polysiloxane-containing polyimide polymer dissolved in diglyme was seen to lose weight in air faster than pure diglyme solvent i.e., the solvent evaporated faster from a container of the polymer solution than from a corresponding container of pure solvent.

What is claimed is:

1. A composition capable of being converted into a polyimide or poly(amide-imide) which, when present in the form of a shaped article, is relatively free of voids, pinholes, cracks and bubbles, said composition comprising a polyamic acid containing about 0.75 to about 5 mole percent of a polysiloxane incorporated in its backbone, dissolved in a solvent selected from the group consisting of tetrahydrofuran, m-dioxane, p-dioxane, monoglyme, diglyme, triglyme, tetraglyme and mixtures thereof.

2. The composition of claim 1 in which the polyamic acid is present in the solvent in an amount of about 5 to about 50 weight percent.

3. The composition of claim 2 in which the polyamic acid is present in the solvent in an amount of 20 to 40 weight percent.

4. The composition of claim 1 in which the polysiloxane is present in an amount of 1.5 to 2.5 mole percent.

5. The composition of claim 1 in which the polysiloxane has a monomeric unit formula of

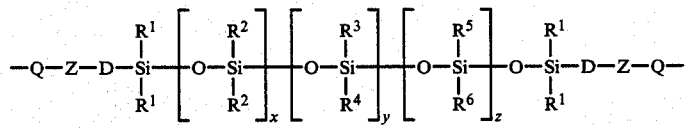

or of formula

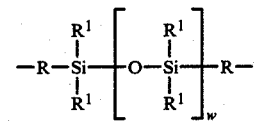

where

Q is a substituted or unsubstituted aromatic group,

Z is —O—, —S—,

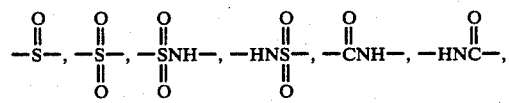

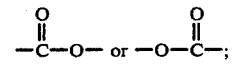

R and D is each unsubstituted or substituted hydrocarbylene;

$R^1$, $R^2$, $R^3$, $R^4$, $R^5$ and $R^6$ each, independently, is unsubstituted or substituted hydrocarbyl;

x, y and z each independently has a value from 0 to 100, and w has a value from 1 to 100.

6. The composition of claim 5 in which the polysiloxane has a monomeric unit formula of

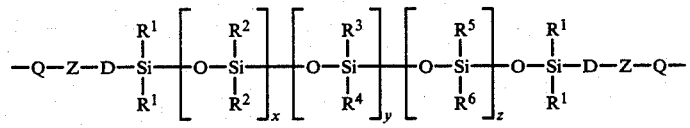

in which

Q is substituted or unsubstituted carbocyclic aromatic of 6 to 18 ring carbon atoms or substituted or unsubstituted heterocyclic aromatic of 5 to 18 ring atoms where the hetero atoms are selected from the group consisting of N, O and S and where any substituents present are selected from the group consisting of alkyl of 1 to 12 carbon atoms, alkynyl of 2 to 12 carbon atoms, cycloalkyl of 4 to 8 carbon atoms, alkoxy of 1 to 12 carbon atoms, alkylthio of 1 to 12 carbon atoms, phenyl, alkylphenylene having 1 to 12 carbon atoms in the alkyl group, phenoxy, phenylthio, alkylcarbonyloxy of 2 to 12 carbon atoms, alkoxycarbonyl of 2 to 12 carbon atoms, bromo, chloro, fluoro, iodo, nitro, cyano, cyanothio, carbonyl, hydroxy, mercapto, formyl, thioformyl and mercaptocarbonyl;

D is substituted or unsubstituted hydrocarbylene of 1 to 3 to 18 carbon atoms;

$R^1$, $R^2$, $R^3$, $R^4$, $R^5$ and $R^6$, each independently, is an unsubstituted or substituted alkyl of 1 to 12 carbon atoms, alkenyl of 2 to 12 carbon atoms, alkynyl of 2 to 12 carbon atoms, cycloalkyl of 4 to 8 carbon atoms, phenyl, alkylphenylene where the alkyl group contains 1 to 12 carbon atoms, phenylalkylene where the alkylene group contains 1 to 12 carbon atoms in the alkenyl group and when substituted, these hydrocarbyl groups are substituted by Br, Cl, I, R, —NC, —NO₂, —OCN, alkoxy of 1 to 8 carbon atoms, —S—(C₁-C₈)alkyl,

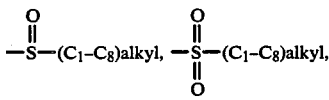

—S—S—(C₁-C₈)alkyl, —COOH, —COSH, —CSOH, —CONH₂, —CN, —CHO, —CHS, —OH, —SH, —NCO and —NR₇R₈ where R₇ and R₈ independently are hydrogen or lower alkyl.

7. The composition of claim 6 in which

Q is unsubstituted or substituted carbocyclic aromatic of 6 to 18 carbon atoms;

D is branched or linear alkylene of 1 or 3 to 12 carbon atoms; and x, y and z is each 0, 8. The composition of claim 7 in which the polysiloxane has a monomeric unit formula of

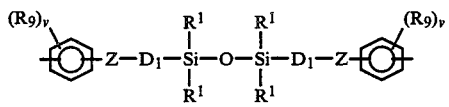

where v is 0 or 4;

R₉ is lower alkyl, lower alkenyl, lower alkynyl, cycloalkyl of 4 to 8 carbon atoms, lower alkoxy, lower alkylthio, phenyl, loweralkylphenylene, phenylloweralkylene, loweralkenylphenylene, phenoxy, phenylthio, loweralkylcarbonyl, loweralkylcarbonyloxy, loweralkoxycarbonyl, bromo, chloro, fluoro, iodo, nitro, cyano, cyanthio, carboxyl, carbonyl, hydroxyl, mercapto, or mercaptocarbonyl;

Z is —O—, —S—,

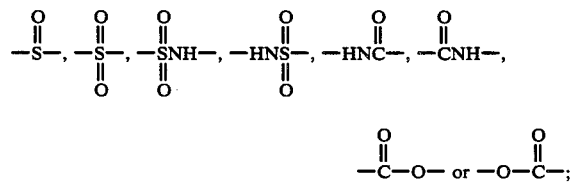

D₁ is methylene or alkylene of 3 to 8 carbon atoms;

R₁ is lower alkyl, lower alkenyl, lower alkynyl, phenyl, loweralkylphenylene, phenylloweralkylene, or lower alkenylphenylene.

9. The composition of claim 5 in which the polysiloxane has a unit formula of

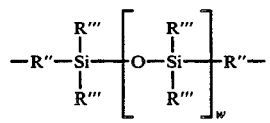

wherein R″ is alkylene or arylene and each R‴ is independently C₁-C₄ alkyl or phenyl.

10. The composition of claim 9 in which the polysiloxane has a monomeric unit formula of

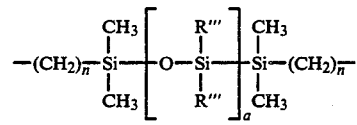

wherein n is an integer of 1 to 6, a has a value of 1 to 30 and each R‴ is independently C₁-C₄ alkyl or phenyl.

11. The composition of claim 10 in which the polysiloxane has the monomeric unit formula of

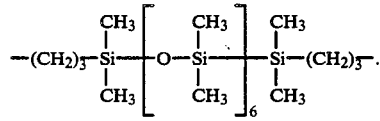

12. The composition of claim 11 in which the polysiloxane has the monomeric unit formula of

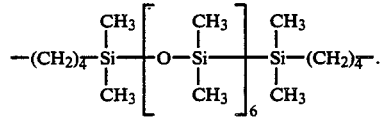

13. The composition of claim 1 in which the polyamic acid is prepared by reacting benzophenone tetracarboxylic acid dianhydride with 3,3' diaminodiphenyl sulfoxide in the presence of 1.5 to 2.5 mole percent of a bis-(amino)polysiloxane having the formula

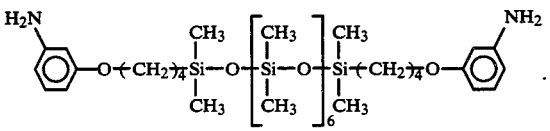

14. The composition of claim 1 in which the solvent is diglyme.

* * * * *